Aug. 9, 1932.  R. J. FORD  1,871,313
METHOD OF MANUFACTURING FOOTWEAR
Filed Oct. 2, 1929
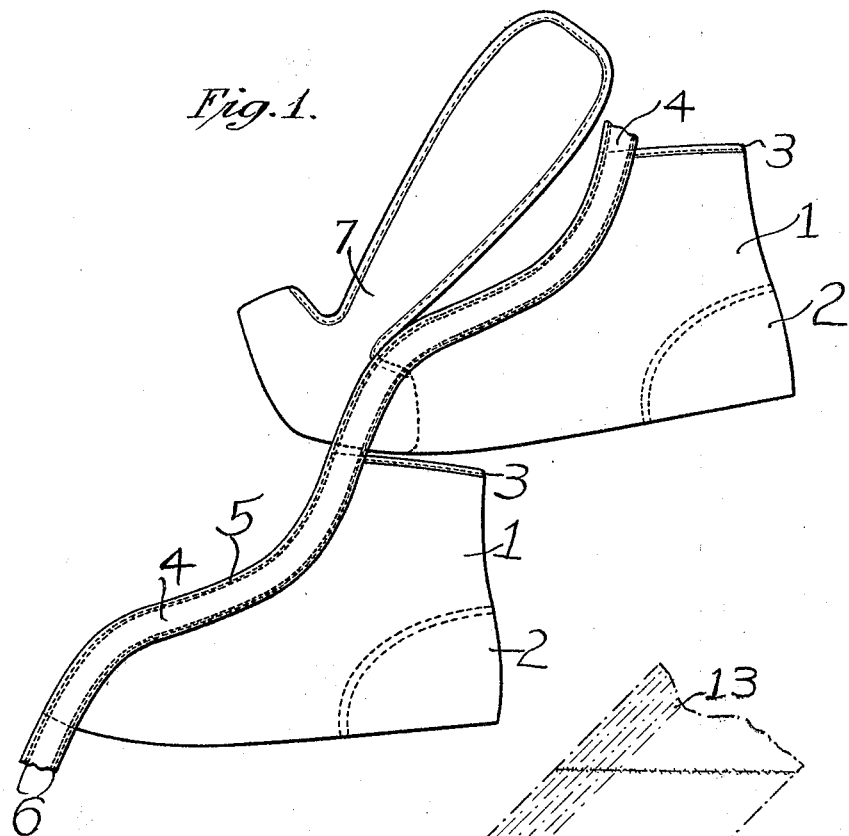
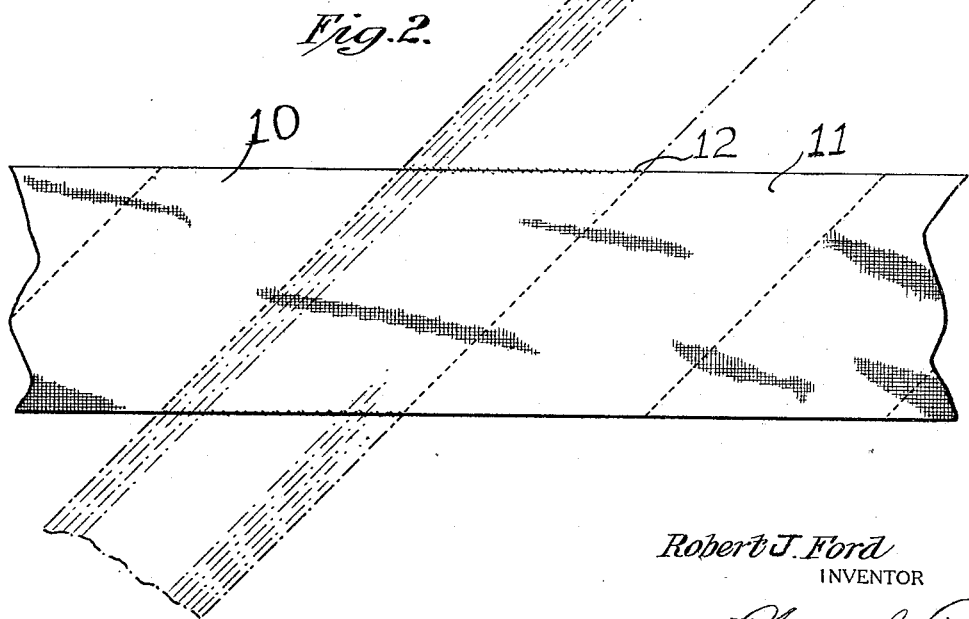
Robert J. Ford
INVENTOR
BY
ATTORNEY Patented Aug. 9, 1932

1,871,313

UNITED STATES PATENT OFFICE

ROBERT J. FORD, OF BRISTOL, RHODE ISLAND, ASSIGNOR TO NATIONAL INDIA RUBBER COMPANY, OF BRISTOL, RHODE ISLAND, A CORPORATION OF RHODE ISLAND

METHOD OF MANUFACTURING FOOTWEAR

Application filed October 2, 1929. Serial No. 396,599.

This invention relates to the art of footwear manufacture, more particularly to the manufacture of rubber fabric footwear, and especially those steps involving the application of side stays to the uppers of rubber fabric footwear.

Heretofore in the manufacture of rubber fabric footwear the upper is cut to proper shape from fabric and the side stays affixed thereto by sewing. The side stays heretofore used have been made from plain square woven fabric having a surface layer of rubber by dieing out side stays to the proper shape or curvature so that they may be applied to the front margin of the fabric upper without bending or wrinkling. It has previously been considered necessary to so form side stays because of the double curvature and the magnitude of the curvature of the front margin of a rubber fabric shoe upper. That curvature is such that ordinary straight rubber fabric strips cannot be twisted to conform to the curvature without wrinkling of the strip to a degree which rendered it impossible to satisfactorily sew the strip to the upper.

The customary method of making and applying side stays to fabric uppers as above described is objectionable in that there is a large amount of scrap created in the operation of dieing out the stays from a rubber fabric sheet. Such loss has amounted to approximately 25% of the rubber fabric sheet. In addition, due to the fact that the strips are died out, it has been impractical to prepare the strips in lengths greater than that to be applied to one shoe so that the application of the side stays to the uppers proceeded one upper at a time. In addition the old process is unnecessarily expensive due to the operations involved in the dieing out of the stay.

It has also been customary in the manufacture of rubber fabric footwear heretofore first to apply the died out stay to the upper by sewing and then to unite a tongue, previously cut from fabric, to the upper by a separate stitching operation. This method of applying tongues to uppers is unnecessarily expensive and the double stitching operation makes the shoe unsightly.

It is the object of this invention to provide a method of applying side stays to fabric uppers which eliminates the step of dieing out the side stays. Another object of the invention is to provide a method of applying side stays to fabric uppers in which the stays are applied in the form of a continuous strip successively to a series of uppers in a single continuous operation. It is a further object of this invention to provide a method of footwear manufacture in which side stays and tongues are simultaneously united to uppers. A further object of this invention is to provide a material of such a nature that a straight strip thereof may be adjusted in conformity with the front margin of a fabric upper and stitched thereto without the formation of wrinkles. Other objects and advantages of the present invention will appear in the following detailed description taken in connection with the accompanying drawing in which:

Fig. 1 is a diagrammatic view of certain parts of a rubber fabric article of footwear at a certain stage of manufacture.

Fig. 2 is a diagrammatic view illustrating the method of manufacturing rubber fabric strips to be used as side stays for rubber fabric footwear.

According to this invention an upper or a series of uppers 1 are cut to shape from fabric. A back stay 2 may be applied and a cuff 3 may be formed either before or after the application of the side stay 4.

According to this invention the side stay 4 is in the form of a straight strip of rubber coated fabric which is arranged on and in conformity with the front margin 5 of the uppers. The strip is then stitched to the upper preferably by a four needle sewing machine thereby forming two rows of stitches 6 on each side of the stay and securely uniting the stay to the upper in one operation.

The side stay 4 may thus be applied to a single upper if desired. However, due to the fact that the side stay 4 is applied in the form of a straight strip arranged to conform to the front margin of the upper, it is convenient and of advantage to arrange a plurality of the uppers in succession as shown in Fig. 1 and continuously sew the strip of rubber coated fabric to the series of uppers. At the end of the operation the side stays may be severed between the successive uppers. This operation is carried out on the same side of a series of uppers and may then be repeated for the opposite side of the same series of uppers either with or without severing the first applied strip of rubber coated fabric before applying the second strip of rubber coated fabric to the other side of the uppers.

After severing the tape, the top of the stay is stitched or closed in with a separate tacking machine to prevent fraying of the stay under wear and to present a finished appearance.

Due to the ease with which the strip of rubber coated fabric is applied to form the side stays of the upper, it is possible, according to this invention, simultaneously to stitch the tongue 7 to the upper in the same operation, the tongue 7 having previously been cut to shape from fabric. This operation is carried out by arranging the tongues in assembled relation with their respective uppers and by arranging the rubber coated strip 4 to follow the contour of the front margins of the uppers and then stitching the strip 4 to the upper and stitching the tongue to the upper in the same continuous operation passing from upper to upper in succession as before described.

Due to the magnitude of the curvature of the front margins of the uppers, and the fact that the curvature is a double one, together with the fact that the said stay is a rather wide strip, it has been impossible to carry out this process with strips of rubber coated fabric heretofore known. Therefore a process of making a novel rubber strip capable of being used to form the side stay 4 has been devised.

This process consists in first applying a coating of rubber to a square woven fabric 10 which rubber may be applied, and preferably is, by spreading a paste of rubber in organic solvents or a thickened latex on to the surface of the fabric, using the usual spreading knife. Such a rubberized square woven fabric is then bias cut at approximately 45° into sections as indicated at 11 in the drawing. Such sections of rubberized square woven fabric are arranged with the side margins in juxtaposition. For reasons which will later appear, it is preferred to place the side edges of the sections 11 in butt relation, although the side edges of the sections may be slightly overlapped with some attendant disadvantages, but without departing from this invention. The juxtaposed side edges of the sections 11 are then sewed together preferably by a zig-zag stitch as indicated at 12 in Fig. 2 of the drawing, thereby forming a sheet of bias cut rubberized square woven fabric.

This sheet of fabric is then coated with a layer of rubber by passing the sheet through an even motion calender. The layer of rubber is applied to the fabric by an even motion calender in order to avoid the application of any tension to the fabric which would, due to the fact that it is bias cut, cause it to be pulled out of shape. The butt joint between the sections 11 of square woven fabric also aids in this calendering operation for the reason that a lap joint when passing through a calender would cause forces to be set up which would pull the fabric out of shape, cause it to wrinkle and prevent the proper application of the rubber layer thereon.

The rubber coated rubberized fabric is then slit into strips as indicated at 13 in Fig. 2 of the drawing, which strips are employed to form the side stays for fabric uppers.

While specific forms of the invention have been disclosed by way of illustration, it is not intended so to limit the invention inasmuch as variations in the details of the processes described may be made without departing from the scope of the invention which is indicated in the following claims.

Having thus described my invention, what I claim and desire to protect by Letters Patent is:

1. In the art of footwear manufacture, the steps of, forming an upper from fabric, forming a tongue from fabric, arranging the tongue and upper in assembled relation, arranging a strip of bias-cut rubberized fabric on and in conformity with the front margin of the upper, stitching the strip, upper and tongue together in one operation.

2. In the art of footwear manufacture, the steps of, forming a plurality of uppers from fabric, forming a plurality of tongues from fabric, arranging the tongues and uppers in assembled relation, arranging a continuous straight strip of bias-cut rubberized fabric on and in conformity with the front margins of the uppers, continuously and successively stitching the strip, uppers and tongues together in one operation, and severing the strip between successive uppers.

Signed at Bristol, county of Bristol, State of Rhode Island, this 28th day of September, 1929.

ROBERT J. FORD.